(12) United States Patent
Tomono

(10) Patent No.: US 8,499,466 B2
(45) Date of Patent: Aug. 6, 2013

(54) RULER FOR TOOL

(76) Inventor: Masayoshi Tomono, Chiba (JP)

(*) Notice: Subject to any disclaimer, the term of this patent is extended or adjusted under 35 U.S.C. 154(b) by 206 days.

(21) Appl. No.: 13/123,058

(22) PCT Filed: Sep. 15, 2009

(86) PCT No.: PCT/JP2009/066073
§ 371 (c)(1),
(2), (4) Date: Apr. 7, 2011

(87) PCT Pub. No.: WO2010/050312
PCT Pub. Date: May 6, 2010

(65) Prior Publication Data
US 2011/0192041 A1    Aug. 11, 2011

(30) Foreign Application Priority Data
Oct. 30, 2008  (JP) .................. 2008-279347

(51) Int. Cl.
*B27B 9/04* (2006.01)
*B23Q 3/18* (2006.01)
(52) U.S. Cl.
USPC ............................... 33/483; 33/640
(58) Field of Classification Search
USPC ............ 33/483, 640, 626, 641, 562, 566, 33/41.4; 83/829, 828, 827, 821
See application file for complete search history.

(56) References Cited

U.S. PATENT DOCUMENTS

| | | | | |
|---|---|---|---|---|
| 293,942 A * | 2/1884 | Brounscombe | ................. | 125/17 |
| 4,341,247 A * | 7/1982 | Price | ............................ | 144/287 |
| 4,660,450 A * | 4/1987 | Rafalow | ........................ | 83/468.4 |
| 4,712,309 A * | 12/1987 | Kingston et al. | ................. | 33/527 |
| 4,916,994 A * | 4/1990 | Hatala | ............................. | 83/763 |
| 4,920,845 A * | 5/1990 | Blanchette | ....................... | 83/574 |
| 4,986,156 A * | 1/1991 | McGinnis | .................... | 83/467.1 |
| 5,205,045 A * | 4/1993 | Liu | ................................. | 33/468 |

(Continued)

FOREIGN PATENT DOCUMENTS

| | | |
|---|---|---|
| BE | 865058 A1 | 7/1978 |
| JP | 54-175694 | 12/1979 |

(Continued)

OTHER PUBLICATIONS

Examination Report in corresponding UK Application No. GB1107980.3 dated Nov. 22, 2012.
International Search Report in corresponding International Application PCT/JP2009/066073.

*Primary Examiner* — Christopher Fulton
(74) *Attorney, Agent, or Firm* — The Law Office of Michael E. Konodoudis

(57) ABSTRACT

A ruler tool is provided comprising a main guide frame 2 having guide portions 2a and 2b, a first guide frame 3 having a guide portion 3a to guide a tool in cooperation with the guide portion, a second guide portion frame 4 having a guide portion 4a to guide a tool in cooperation with the guide portion 2a, and a pair of fences each securing each of the guide frames with a predetermined interval being set among the guide frames so as to hold the tools, in a sandwiched manner, and being mounted in a manner to face each other so as to be apart by a distance more than a range of working by the tools and having an abutment surface to support a member to be worked at a predetermined angle inside one of the fences and positioning grooves 5a and 6a.

7 Claims, 18 Drawing Sheets

U.S. PATENT DOCUMENTS

| | | | | |
|---|---|---|---|---|
| 5,493,789 A * | 2/1996 | Duginske | | 33/640 |
| 6,708,422 B1 * | 3/2004 | Stojanovski | | 33/640 |
| 6,725,558 B2 * | 4/2004 | Gommper et al. | | 33/640 |
| 2003/0192192 A1 * | 10/2003 | Kirkland | | 33/640 |
| 2010/0251870 A1 * | 10/2010 | Wilson | | 83/829 |

FOREIGN PATENT DOCUMENTS

| | | |
|---|---|---|
| JP | 62-022323 | 2/1987 |
| JP | 04-320801 A | 11/1992 |
| JP | 06-064803 | 9/1994 |
| JP | 2002-036201 A | 2/2002 |

\* cited by examiner

RULER FOR TOOL

FIELD OF THE INVENTION

The present invention relates to a ruler tool to guide a tool in a predetermined direction at time of working a member to be worked.

BACKGROUND OF THE INVENTION

Conventionally, a ruler tool to guide a tool depending on a tool (for example, an electric saw, electric router, or the like) or on types of working at time of cutting and/or machining of a member to be worked by using a tool, especially at time of performing working on a member to be worked specified to some extent (see Patent References 1 to 3).

According to Patent Reference 1, a ruler tool is secured to a portion to be worked of a square member at time of forming a tenon and/or a tenon groove at an end of a square member being a member to be worked and configured to have a pair of guide rails to support a circular saw being a tool and a bar-like coupled body with an approximately V-shape to support the guide rails.

According to Patent References 2 and 3, inclined grooves are cut on a corner portion of a square member being a member to be worked and a base to be secured to a member to be worked and a pair of guide rails supported by the base in a manner in which angles can be changed.

Patent Reference 1: Japanese Utility Model Laid-open No. Hei 06-06480
Patent Reference 2: Japanese Utility Model Laid-open No. Sho 54-175694
Patent Reference 3: Japanese Utility Model Publication No. Sho 62-0223323

However, any one of ruler tools configured as above is directly secured to a member to be worked.

Therefore, at time of fixing a ruler tool depending on a desired work position (portion to be worked), due to inequality on a material surface, it is difficult to maintain fixing strength and the deflection easily occurs at time of working, causing the occurrence of errors at working accuracy. Positioning between a tool and a portion to be worked becomes difficult and the conventional technology is limited only to usage of special working and delicate working, as a result, causing general versatility of the ruler tool to be low.

Moreover, another problem arises that it is difficult to assemble and disassemble the ruler tool which is made large-scaled, causing inconvenience carrying at working sites.

In view of the above, it is an object to provide the ruler tool which improves working accuracy and its general versatility for use of kinds of a member to be worked or of kinds of working by positioning the ruler tool to a member to be worked.

BRIEF SUMMARY OF THE INVENTION

A ruler tool of the present invention is characterized by including a main guide frame having a guide portion in each of both edge portions facing each other, a first guide frame having a guide portion positioned in parallel to one guide portion of the main guide frame and operated to guide a tool in an extending direction in cooperation with the guide portion, a second guide frame having a guide portion positioned in parallel to another guide portion of the main guide frame and operated to guide a tool in an extending direction in cooperation with the guide portion, and a pair of fences each securing each of the guide frames with a predetermined interval being set among the guide frames so as to hold the tools, in a sandwiched manner, among the guide portion of the main guide frame, the guide portion of the first guide frame and, the second guide portion of the second guide frame, wherein each of the fences is mounted in a manner to face each other so as to be apart by a distance of more than a range of working by the tools for a member to be worked and at least one side portion of each of the guide frames is overhung outside a predetermined distance from one of the fences and is secured and an abutment surface and positioning groove are formed to support a member to be worked at a predetermined angle inside another fence.

By positioning the ruler tool in a member to be worked, the ruler tool can improve working accuracy and its general versatility for use of kinds of a member to be worked or of kinds of working.

BRIEF DESCRIPTION OF THE DRAWINGS

FIG. 5(A) is a plan view of the main guide frame, FIG. 5(B) is a side view of the main guide frame, and FIG. 5(C) is a front view of the main guide frame.

FIG. 6(A) is a plan view of the guide frame, FIG. 6(B) is a side view of the guide frame, and 6(C) is a front view of the guide frame.

FIG. 13(A) is a plan view of the auxiliary ruler, and FIG. 13(B) is a side view of the auxiliary ruler.

DETAILED DESCRIPTION OF THE INVENTION

Next, a ruler tool of an embodiment of the present invention is described by referring to drawings.

First Example

Figure 1:
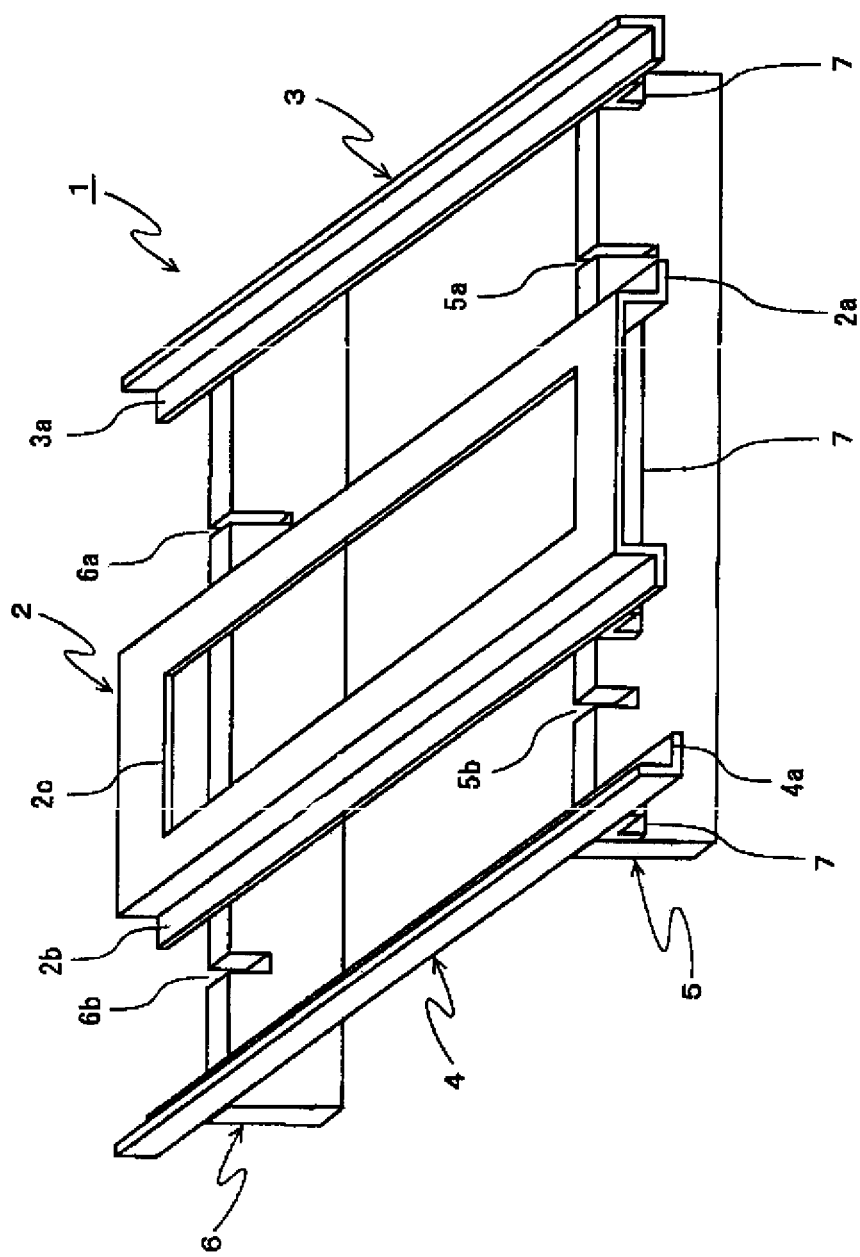
FIG. 1 is a perspective view of a ruler tool of the first example of the embodiment of the present invention.
Figure 2:
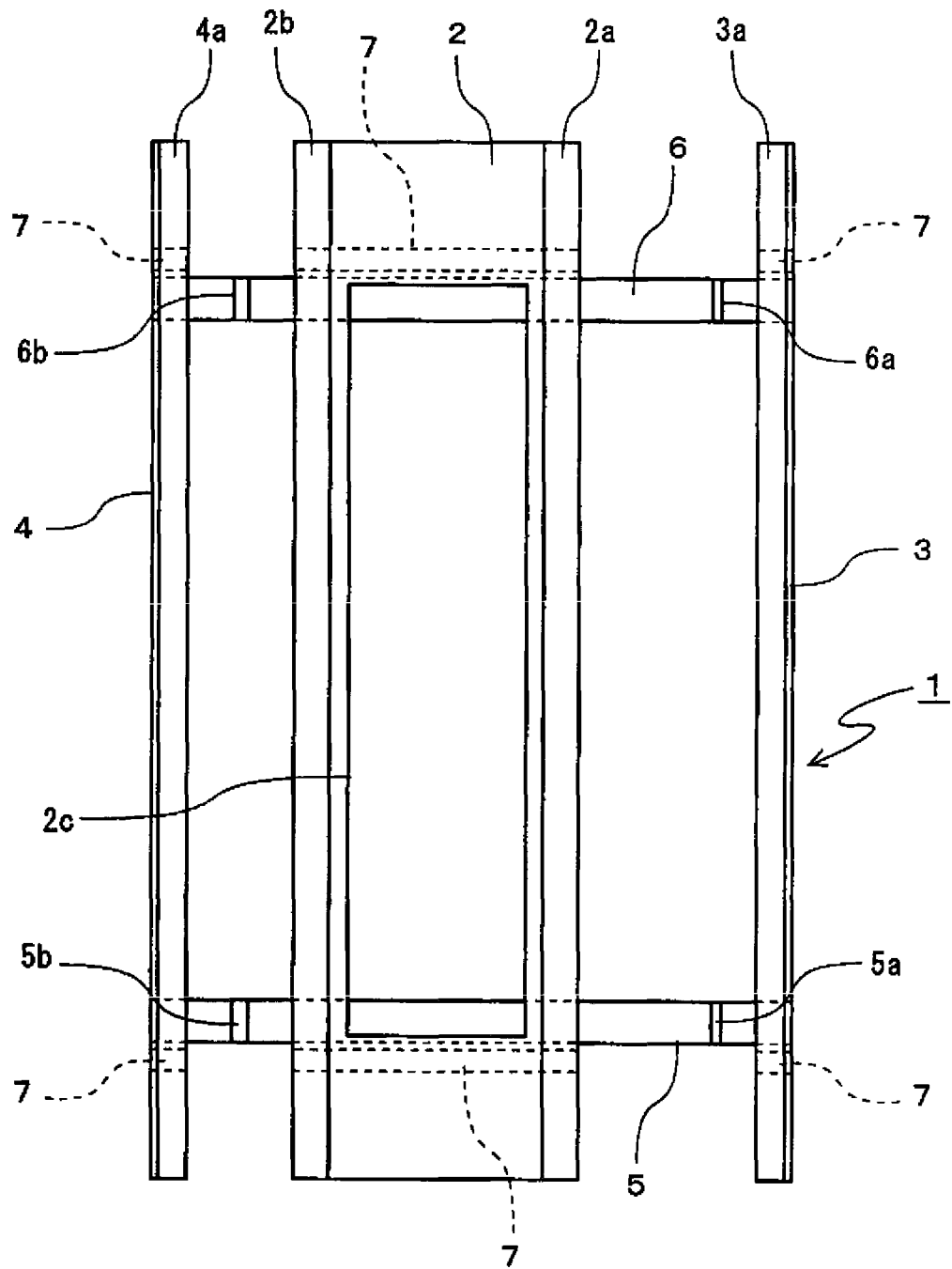
FIG. 2 is a plan view of the ruler tool of the first example of the embodiment of the present invention.
Figure 3:
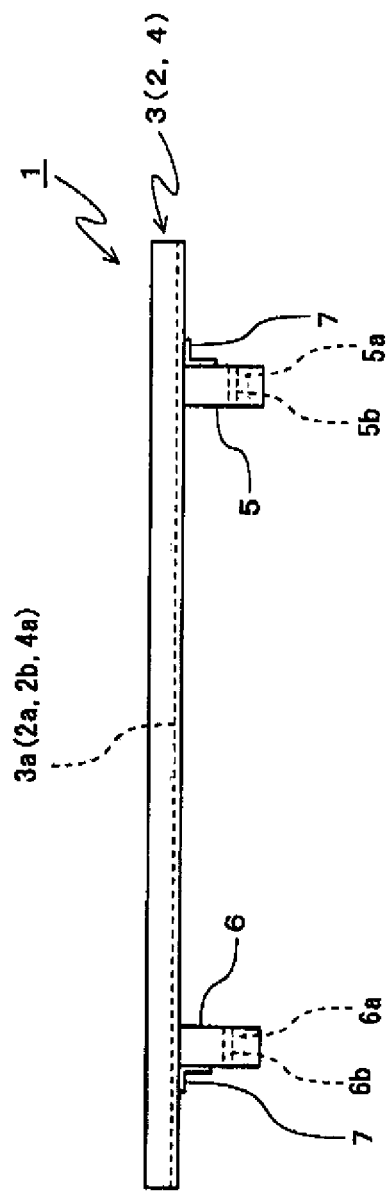
FIG. 3 is a side view of the ruler tool of the first example of the embodiment of the present invention.
Figure 4:
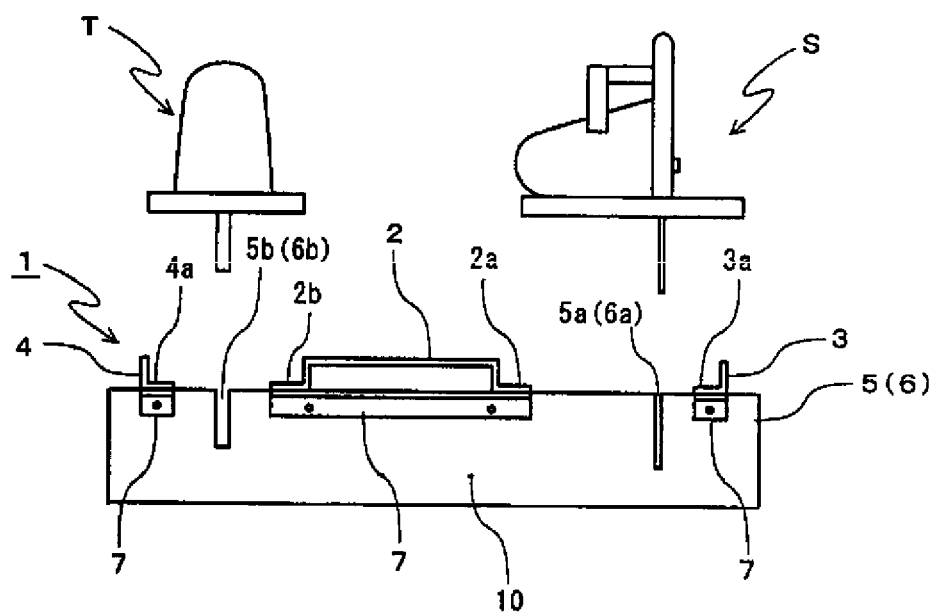
FIG. 4 is a front view showing a relation between the ruler tool and a tool of the first example of the embodiment of the present invention.
Figure 5:
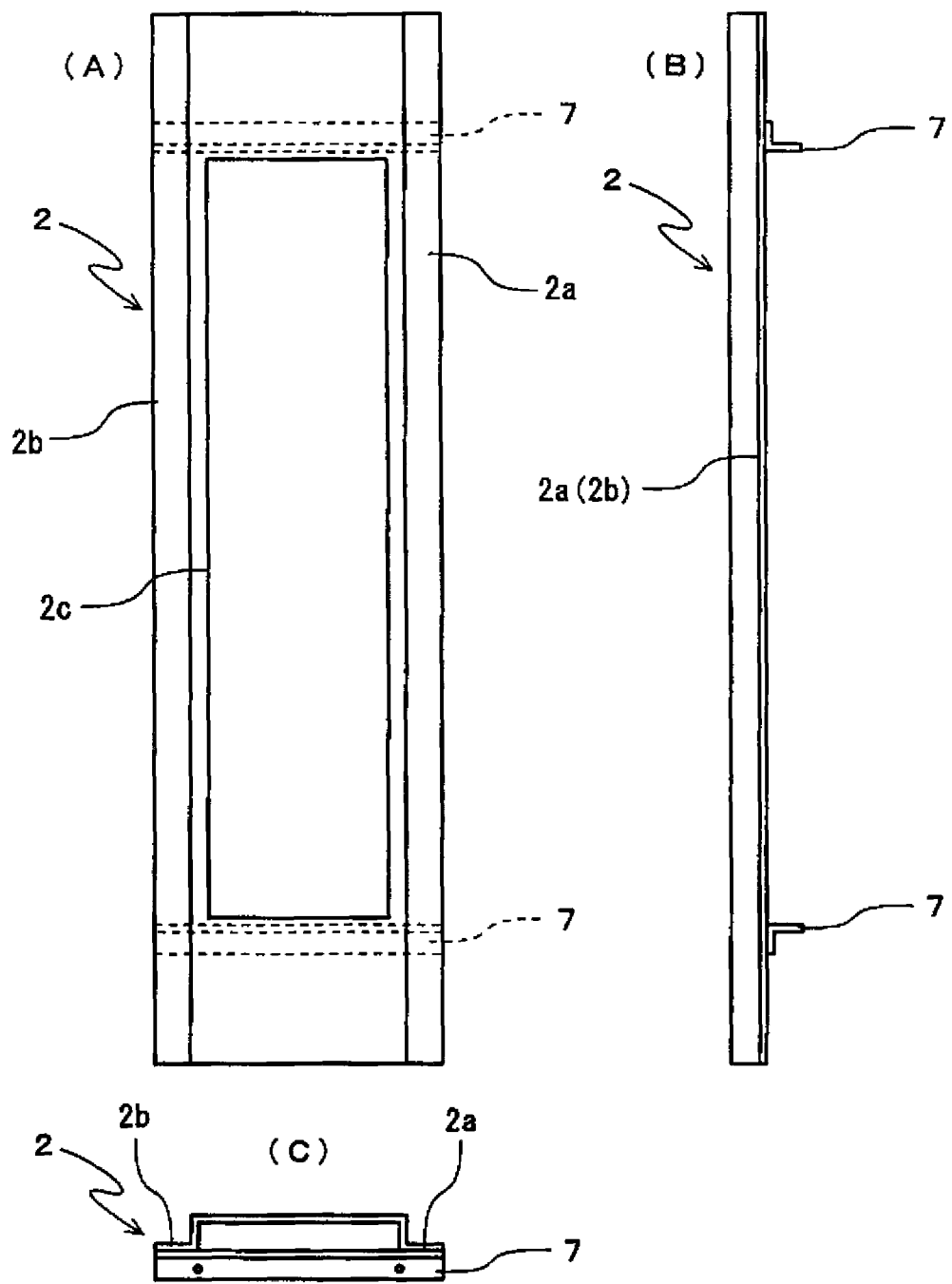
FIG. 5 shows a main guide frame to be used for the ruler tool of the embodiment of the present invention.
Figure 6:
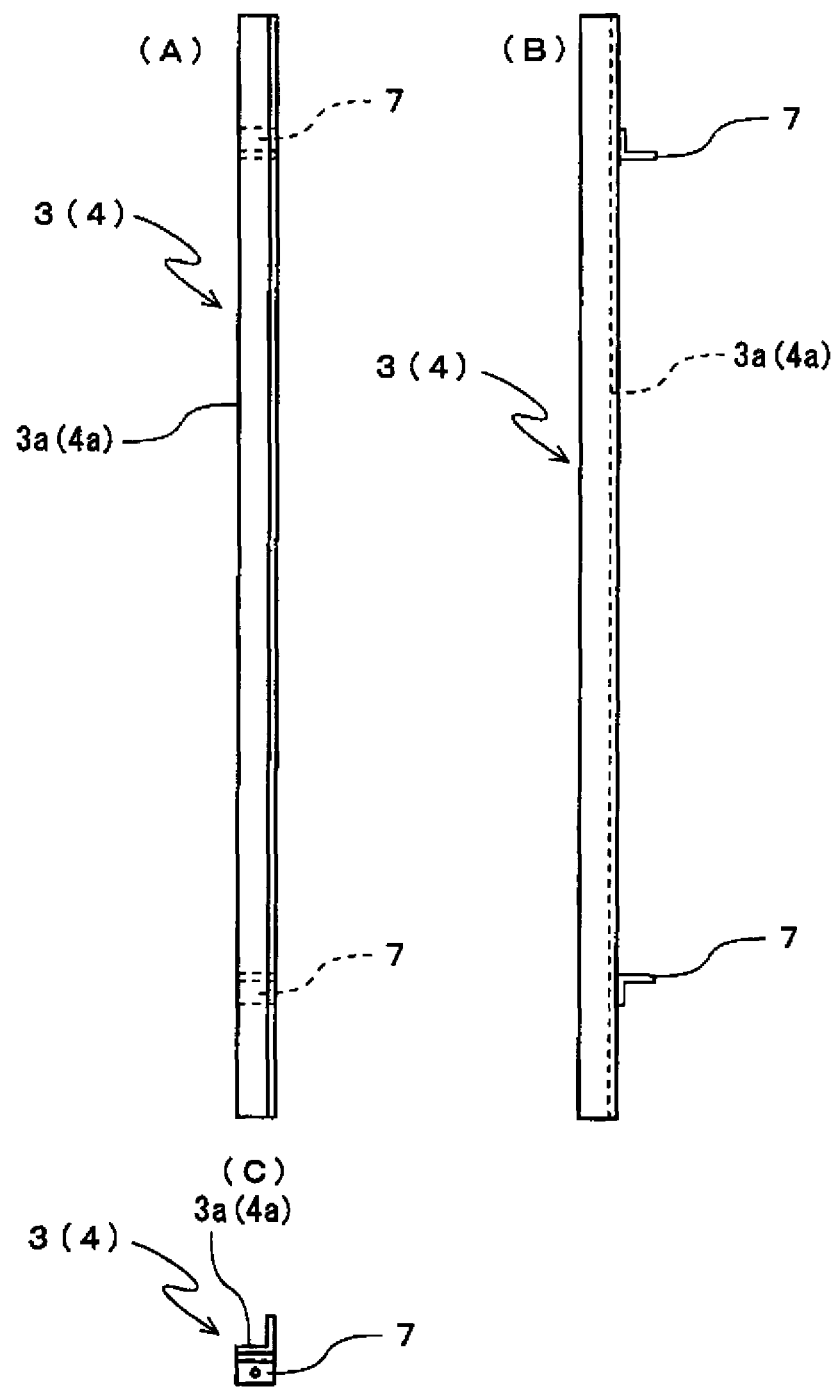
FIG. 6 shows a guide frame to be used for the ruler tool of the embodiment of the present invention.

FIGS. 1 to 6 are diagrams showing the ruler tool of the first example of the embodiment of the present invention. FIG. 1 is a perspective view showing the ruler tool of the first example of the embodiment of the present invention. FIG. 2 is a plan view of the ruler tool of the first example of the embodiment of the present invention. FIG. 3 is a side view of the ruler tool of the first example of the embodiment of the present invention. FIG. 4 is a front view showing a relation between the ruler tool and a tool of the first example of the embodiment of the present invention. FIGS. 5A, 5B, and 5C are diagrams showing a main guide frame to be used in the ruler tool of the first example of the embodiment of the present invention. FIG. 5A shows its plan view, FIG. 5B shows its side view, and FIG. 5C shows its front view. FIGS. 6A, 6B, and 6C are diagrams showing a guide frame to be used in the ruler tool of the first example of the embodiment of the present invention. FIG. 6A shows its plan view, FIG. 6B shows its side view, and 6C shows its front view.

As shown in the above drawings, the ruler tool 1 of the first example of the embodiment of the present invention includes the main guide frame 2 having a guide portion 2a and a guide portion 2b disposed respectively in each of both edge portions facing to each other, a first guide frame 3 having a guide portion 3a positioned in parallel to the one guide portion 2a of the main guide frame 2 and operated to guide a tool (for example, an electric saw S shown in FIG. 4) in an extending direction in cooperation with the guide portion 2a, a second guide frame 4 having a guide portion 4a positioned in parallel to another guide portion 2b of the main guide frame 2 and operated to guide a tool (for example, a router T shown in FIG. 4) in an extending direction in cooperation with the guide portion 2b, a pair of fences 5 and 6 each fixing the guide frames 2, 3, and 4 with a predetermined interval set among the guide frames 2, 3, and 4 so as to hold the tools S and T, in a sandwiched manner, among the guide portion 2a of the main guide frame 2, the guide portion 3a of the first guide frame 3 and, the second guide portion 4a of the second guide frame 4, and brackets each being secured to bottoms positioned near to both ends of the fences 5 and 6.

Moreover, a horizontal surface and a vertical surface of making up the guide portion 2a, a horizontal surface and a vertical surface making up the guide portion 3a, and a horizontal surface and a vertical surface 4a are formed integrally and each of horizontal surfaces of the guide portions 2a, 3a, and 4a and each of vertical surfaces of the guide portions 2a, 3a, and 4a respectively faces to one another to become approximately L-shaped.

Each of the fences 5 and 6 is mounted in a manner to face each other so as to be apart by a distance of more than a range of working by tools S and T for a member to be worked (not shown) such as a square member or a plate member. According to the example of the embodiment of the present invention, the pair of the fences 5 and 6 is configured to serve as an abutment surface to support the member to be worked at a predetermined angle on each inner side portion (interval wall) and has positioning grooves 5a, 5b, 6a, and 6b that have been formed by the tools S and T. Moreover, the pair of the fences 5 and 6 is made of timber (square member), resin, or metal such as aluminum, stainless or the like. When the pair of the fences 5 and 6 is made of metal materials, the fences 5 and 6 may be hollow (a square pillar).

Each of the guide frames 2, 3, and 4 is made of stainless or the like having a relatively low friction resistance and is attached, in a fixed manner, using the brackets, to an outer wall surface of the fences 5 and 6 in a state where stiffness is ensured by bending work of forming each of the guide portions 2a, 2b, 3a, and 4a. Moreover, both ends of each of the guide frames 2,3, and 4 extrude from positions of the fences 5 and 6 toward an outside directions more than positions where the tools S and T extrude from positions of the fences 5 and 6 when working of the member to be worked by the tools S and T is started.

This allows positioning grooves 5a, 5b, 6a, 6b to be formed on the fences 5 and 6 by direct working of the tools S and T.

The guide portion 2a of the main guide frame 2 and the guide portion 3a of the first guide frame 3 and the guide portion 2a of the main guide frame 2 and the guide portion 4a of the second guide frame 4 are positioned in a manner opposite to one another so that a different predetermined interval is set between the guide portion 2a of the main guide frame 2 and the guide portion 3a of the first guide frame 3 and between the guide portion 2a of the main guide frame 2 and the guide portion 4a of the second guide frame 4 to allow the tools S and T to be held in a sandwiched manner.

Therefore, it is made possible to perform working of various kinds (for example, cutting and machining) using the tools S and T by using only one ruler tool 1. An aperture 2c is formed in a central portion of the main guide frame 2, which makes the main guide frame 2 lightweight and also improves visibility among the guide portion 3a of the first guide frame 3 and the guide portion 2b of the main guide frame 2 and the guide portion 4a of the second guide frame 4.

By narrowing the above aperture width so as to be shorter than at least one of the facing interval (space) between the guide portion 2a and the guide portion 3a or the facing interval (space) between the guide portion 2a and the guide portion 4a, the main guide frame 2 can be used also as a mounting base for the tools S and T moving between the guide portion 2a and guide portion 3a or between the guide portion 2a and guide portion 4a. Moreover, since the guide portions 2a and 2b are so constructed as to be approximately L-shaped, the aperture 2c enables working end portions of the tools S and T to be lifted by the height corresponding to those of the guide portions 2a and 2b, resulting in no occurrence of cutting edge chips or the like.

Each of the brackets is bonded to each of the guide frames 2, 3, and 4 by welding and is secured to each of the fences 5 and 6 by using screws, however, each of the guide frames 2, 3, and 4 may be secured to each of the fences 5 and 6 without using the brackets 7. In this case, it is necessary to take the kind of screws and places to be fixed into consideration so that heads of the screws or the like do not extrude from the guiding surfaces of the guide portions 2a, 3a, and 4a of the guide frames 2, 3, and 4.

In the configurations described above, for example, in the state where the positioning grooves 5a, 5b, 6a, and 6b are not yet formed and where the fences 5 and 6 are positioned in the inside of the brackets, the main guide frame 2 and guide frames 3 and 4 are secured to the fences 5 and 6.

In this case, by using the brackets, the distance between the fences 5 and 6 and angles of each of the guide frames 2,3, and 4 relative to the fences 5 and 6 can be determined. A dominant arm of the like of a worker can be taken into consideration for arranging each component. Moreover, the height of the fences 5 and 6, interval between the fences 5 and 6, length of each guide frames 2, 3, and 4, interval among the guide frames 2, 3, and 4 can be appropriately set according to the state of a member to be worked and/or depending on the kinds of tools S and T to be used.

Furthermore, the interval between the fences 5 and 6 and/or the length of each of the guide frames 2, 3, and 4 and/or the interval among the guide frames 2, 3, and 4 can be appropriately changed by expansion or contraction. If the angle formed between each of the fences 5 and 6 and each of the guide frames 2, 3, and 4 does not become rectangular, adjustment is made by inserting a shim washer (not shown).

In this state, when the tool S is, for example, a circular saw, the height of the fences 5 and 6 is determined in accordance with the size of the tool S (maximum capacity of the saw) and the interval among the guide frames 2, 3, and 4 is set in accordance with the state of the tool S.

After the fixing of each of the guide frames 2, 3, and 4 is completed, for example, the tool S is set among the guide portions 2a and 3a of the guide portions 2 and 3 that have overhung outside the fence 5 and positioning grooves 5a and 6a are formed by the tool S itself according to the guidance of the guide portions 2a and 3a.

When a plate or square member being a member to be worked is to be cut by the tool S, by allowing the member to be worked to be struck to come into contact with the inner wall of the fence 5 serving as an abutment surface and allowing the positioning groove 5a to be fitly positioned in a desired cutting place, the positioning of cutting place can be easily achieved and cutting operation by using the tool S can be made.

By setting the tool T between the guide portions 2a and 4a of the guide frames 2 and 4 being adjacent to each other, working of next processes is performed on the member to be worked after cutting (grooving) process.

By using, if necessary, not only a router but also special attachment or the like as the different tool T, the tool T can be used for an electric tool such as an electric drill, electric planer, or a hand tool such as a knife grinder.

Thus, simply by powering on the tools S and T (not simultaneous operation) and by sliding the tools S and T between the guide portion 2a of the main guide frame 2 and the guide portion 3a of the first guide frame 3 and between the guide portion 2a of the main guide frame 2 and the guide portion 4a of the second guide frame 4, a cut groove can be formed on the fences 5 and 6.

The cut groove can be used as positioning grooves 5a, 5b, 6a, and 6b operated integrally with the ruler tool 1 as a guide tool and, by positioning a member to be worked fitly in these positioning grooves 5a, 5b, 6a, and 6b when succeeding working is performed on the member to be worked, positioning can be achieved and, for example, by drawing an ink line on a portion to be worked of the member to be worked and by fitly positioning the positioning grooves 5a, 5b, 6a, and 6b on the ink line, working with high dimensional accuracy can be achieved.

Moreover, when a cut groove is formed on a member to be worked, it is preferable to use the fences 5 and 6 having height and thickness (boldness) that can keep strength by considering a maximum cutting depth of the tool S and operating load or the like.

By the above operation, various materials put between the fences 5 and 6 can be treated in a flexible manner and, for example, in the case of a square member, by rotating its working surface, cutting process with up to 2 times the cutting capability of the tool S is made possible.

An underlying plate (not shown) for adjusting a height in the case of having or not having a groove corresponding to a groove 10a between the fences 5 and 6 may be disposed to enable the adjustment of the height and, in accordance to types of working, the underlying plate for the adjustment of height in the case of cutting working may be provided or may not be provided in the case of grooving (or changing the plate thickness).

First Modified Example

As described above, in order to use different tools S and T between the guide portion 2a and the guide portion 3a and between the guide portion 2a and the guide portion 4a, an interval between the guide portions 2a and 3a and an interval between the guide portions 2a and 4a are made different. For example, when the same tool S is placed vertically or horizontally in each of the intervals, each of the intervals may be set so as to hold the tool S in a sandwiched manner.

Figure 7:
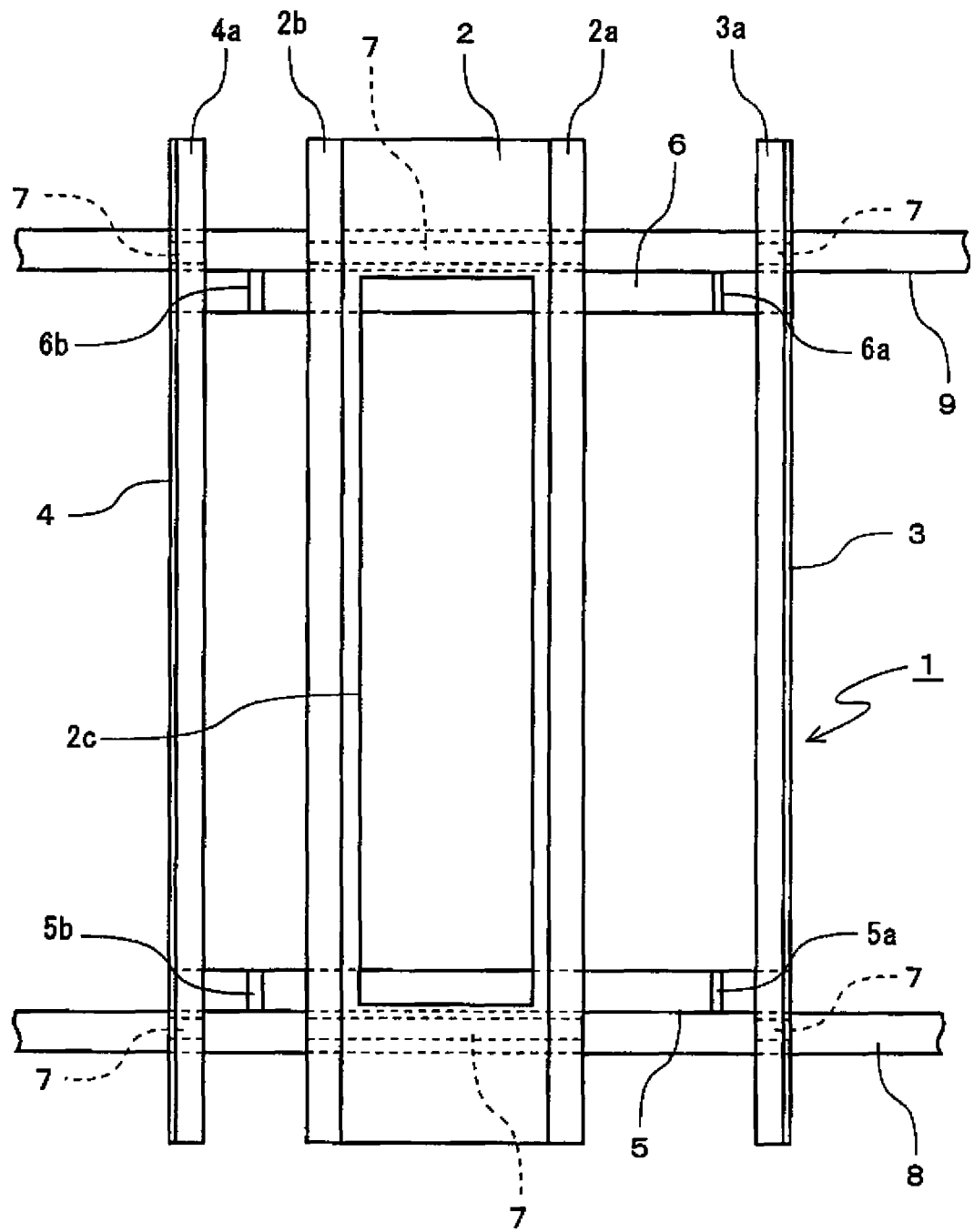
FIG. 7 is a plan view of a ruler tool of a first modified example of the embodiment of the present invention.

As shown in FIG. 7, outside the fences 5 and 6, a pair of guide fences 8 and 9 is mounted with which outer walls of the fences 5 and 6 come into sliding contact so that the position of the ruler tool 1 is integrally changed in a sliding manner along an extending direction of the fences 5 and 6 and, when the tool S is horizontally placed, the ruler tool 1 and tool S may be integrally moved along the guide fences 8 and 9 and their positions may be changed. Either of the guide fences 8 and 9 may be provided. The edge portion of the aperture 2c is made stepwise like the guide portions 2a and 3b and the stepwise portion may be used as a supporting portion when the tool S is placed horizontally.

If the guide fences 8 and 9 have a function of integrally guiding the ruler tool 1, the length of each of the guide fences 8 and 9 may be set in accordance with the length of a member to be worked and its height, if the ruler tool 1 can be guided, is not designated.

The height and length of the guide fences 8 and 9 can be set and the existence of the underlying plate, size and thickness of the underlying plate 10 are determined in accordance with kinds of tools to be used, size of a member to be worked or working type (for example, cutting work and grooving work) for the member to be worked.

Second Example

Figure 8:
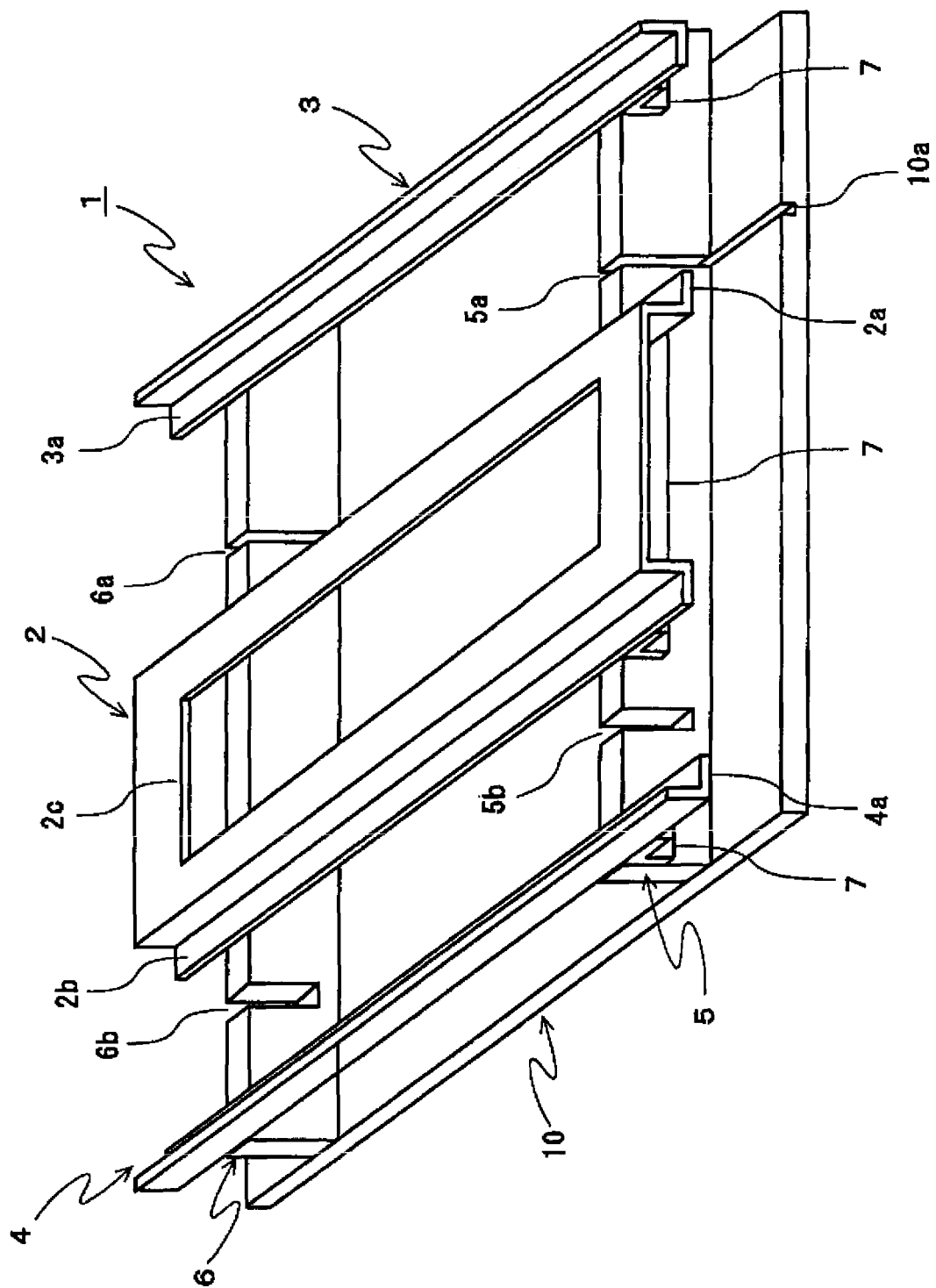
FIG. 8 is a perspective view of a ruler tool of the second example of the embodiment of the present invention.
Figure 9:
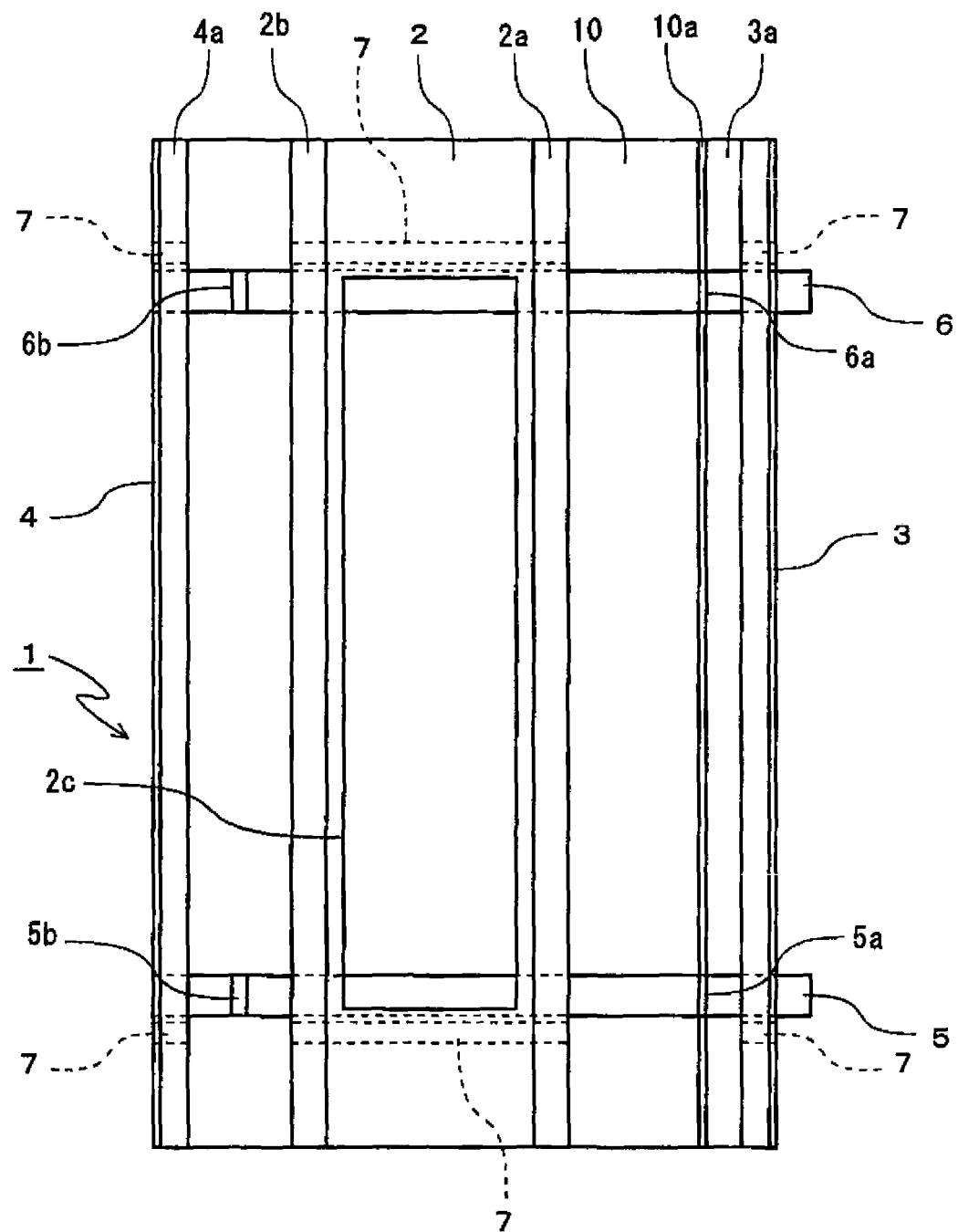
FIG. 9 is a plan view of the ruler tool of the second example of the embodiment of the present invention.
Figure 10:
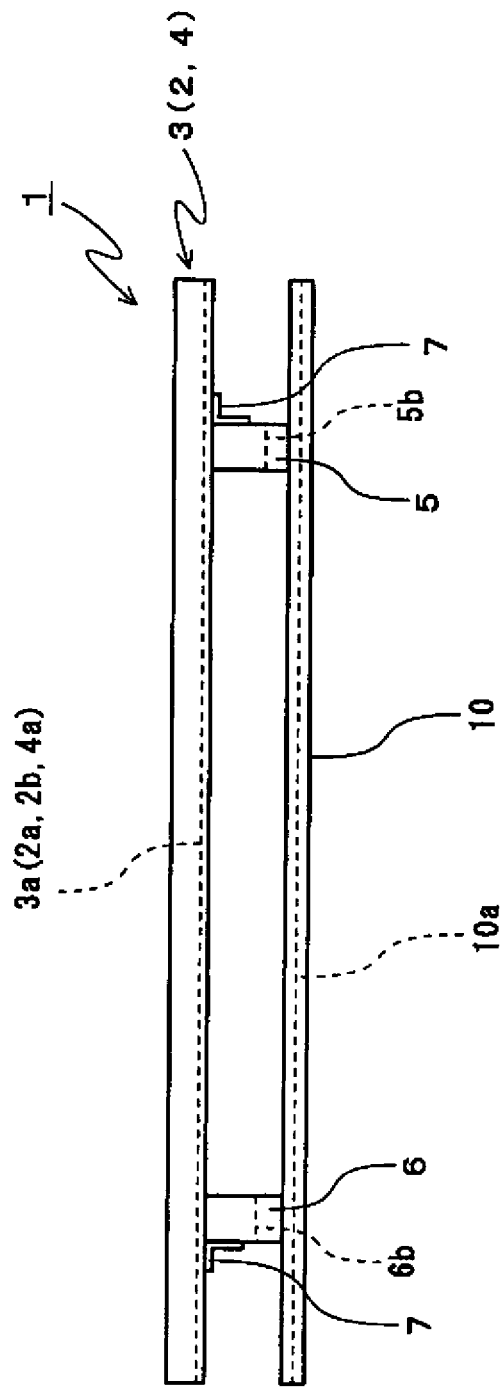
FIG. 10 is a side view of a ruler tool of the second example of the embodiment of the present invention.
Figure 11:
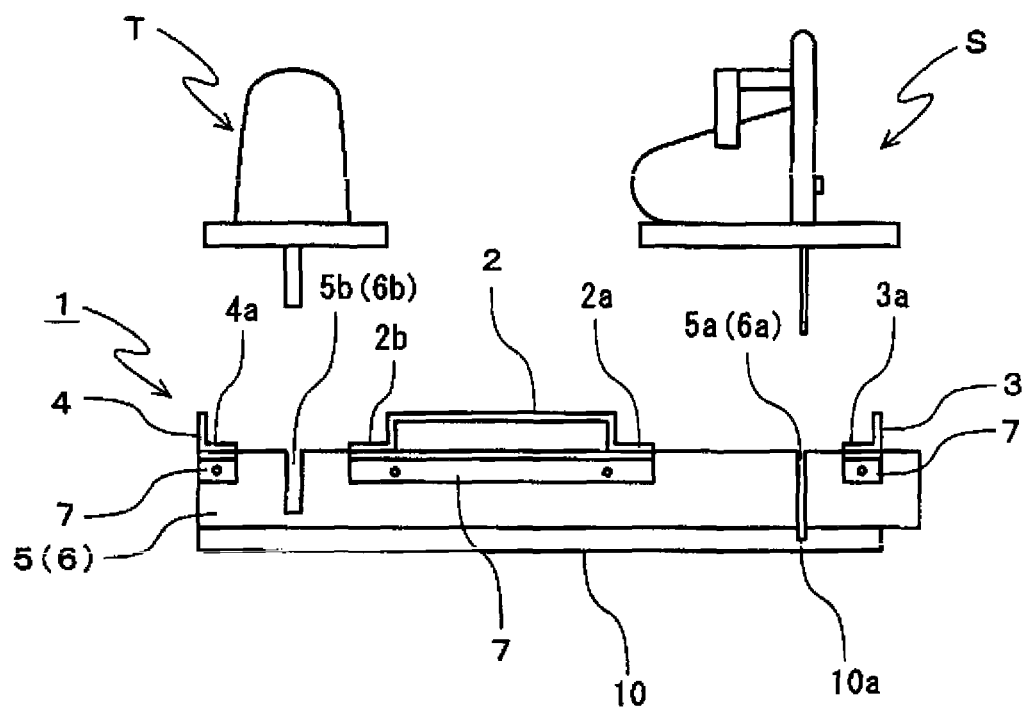
FIG. 11 is a front view showing a relation between the ruler tool and the tool of the second embodiment of the present invention.

FIGS. 8 to 11 are diagrams showing a ruler tool of a second example of the embodiment of the present invention. FIG. 8 is a perspective view showing the ruler tool of the second example of the embodiment of the present invention. FIG. 9 is a plan view showing the ruler tool of the second example of the embodiment of the present invention. FIG. 10 is a side view showing the ruler tool of the second example of the embodiment of the present invention. FIG. 11 is a front view showing a relation between the ruler tool and a tool of the second example of the embodiment of the present invention.

As shown in the drawings, the ruler tool 1 of the second example of the embodiment of the present invention includes a main guide frame 2 having a guide portion 2a and a guide portion 2b in both end edges facing each other, a first guide frame having a guide portion 3a disposed in parallel to the guide portion 2a of the main guide frame 2 and configured to guide the tool (for example, the electric saw in FIG. 4) in cooperation with the guide portion 2a in an extending direction, a second guide frame 4 having a guide portion 4a disposed in parallel to the guide portion 2b of the main guide frame 2 and configured to guide the tool (for example, the electric saw in FIG. 4) in cooperation with the guide portion 2*b* in an extending direction, a pair of fences 5 and 6 each fixing each of the guide frames 2, 3, and 4 with a predetermined interval being set among the guide frames 2, 3, and 4 so as to hold the tools S and T, in a sandwiched manner, among the guide portion 2*a* of the main guide frame 2, the guide portion 3*a* of the first guide frame 3 and, the second guide frame 4*a* of the second guide frame 4, brackets each being secured to bottoms near to both ends of the fences 5 and 6, a plate-shaped base member 10 on which the pair of the fences 5 and 6 is disposed, with a predetermined interval between the fences 5 and 6, in parallel to each other.

The configurations of the main guide frame 2, guide frames 3 and 4, fences 5 and 6, and bracket 7 are the same as for the above first example and, therefore, their detailed descriptions are omitted.

The base member 10 is constructed of a plate material made of timber, resin, metal, or the like having a predetermined thickness and size. On the base member 10, a positioning groove 10*a* is formed which is formed at the same time when the positioning grooves 5*a* and 5*b* are formed by direct working using the tool S.

Either of the fences 5 or 6 is cut or partitioned by direct formation of the positioning grooves 5*a* or 6*a* using the tool S and it is necessary that the base member 10 has a thickness enough to avoid the cutting or partitioning of the base member 10 caused by direct formation of the positioning groove 10*a* using the tool S.

Moreover, when the guide fences 8 and 9 are to be mounted, the guide fences 8 and 9 are positioned outside the fences 5 and 6 and outside the base member 10 in a manner in which the ruler tool 1 moves, together with the fences 5 and 6, toward the extending direction of the fences 5 and 6 in a sliding manner and in which the outer wall of the base member 10 comes into sliding contact with the guide fences 8 and 9.

In such configurations as above, for example, in a state in which positioning grooves 5*a*, 5*b*, 6*a*, 6*b*, and 10*a* are not formed and in which the fences 5 and 6 are positioned on inner sides of the bracket 7, the main guide frame 2, guide frames 3 and 4 are secured to the fences 5 and 6 and then the base member 10 is fixed on the fences 5 and 6.

By using the bracket 7, the interval between the fences 5 and 6 and each angle of the guide frames 2, 3, and 4 relative to the fences 5 and 6 can be determined. Their arrangement by taking the dominant arm into consideration is made possible. The size and thickness of the base member 10, height of each of the fences 5 and 6, interval between the fences 5 and 6, length of each of the guide frames 2, 3, and 4, and interval among these guide frames 2, 3, and 4 can be appropriately set in accordance with kinds of a member to be worked as an object to be worked.

The interval between the fences 5 and 6, length of each of the guide frames 2, 3, and 4, interval among the guide frames 2, 3, and 4 can be appropriately changed by expansion or contraction. Further, if the angle of each of the guide frames 2, 3, and 4 does not become rectangular, a shim washer or the like (not shown) is inserted for adjustment.

In this state, for example, in the case of the tool S such as the circular saw, thickness of the base member 10 and height of each of the fences 5 and 6 is determined depending on the size of the tool S and the interval between guide frames 2 and 3 is set in accordance with the tool S.

After the fixing of the fences 5 and 6 and the guide frames 2 and 3 is completed, the tool S is set between the guide portions 2*a* and 3*a* of the guide frames 2 and 3 which have overhung outside the fence 5 and positioning grooves 5*a*, 5*b*, 6*a*, 6*b*, 10*a* are formed by the tool S itself by the guidance of the guide portions 2*a* and 3*a*.

Further, when the plate member or square member being a member to be worked is actually cut by the tool S, while the inner wall of the fence 5 as an abutment surface is struck to come into contact, by positioning the positioning grooves 5*a* and 10*a* fitly in a desired portion to be cut, positioning of a portion to be cut can be achieved and a cutting operation can be performed by using the tool S.

The member to be worked after the completion of cutting (groove cutting) working is treated in the next process after setting the tool T between the guide portions 2*a* and 4*a* of the guide frames 2 and 4.

The different tool T, by using not only a router but also a special attachment, if necessary, can be used for an electric tool such as an electric drill, disk grinder, electric planer and a hand tool such as a knife grinder.

Thus, the tools S and T are disposed between the guide portion 2*a* of the main guide frame 2 and the guide portion 3*a* of the first guide frame 3 and between the guide portion 2*b* of the main guide frame 2 and the guide portion 4*a* of the second frame 4 and, by powering the tool S and tool T (not simultaneous operation) and by sliding the tool S and tool T, it is possible to form a cut groove in the fences 5 and 6 and base member 10.

This cut groove can be used as positioning grooves 5*a*, 5*b*, 6*a*, 6*b*, and 10*a* which function integrally with the ruler tool as the guide tool and, therefore, when the member to be worked is to be worked thereafter, positioning can be achieved simply by positioning a member to be worked fitly in these positioning grooves 5*a*, 5*b*, 6*a*, 6*b*, and 10*a* and, for example, working with high dimensional accuracy can be achieved simply by drawing an ink line on a portion to be worked of the member to be worked and by positioning the positioning grooves 5*a*, 5*b*, 6*a*, 6*b*, and 10*a* fitly in the ink line.

When rectangular cutting working is performed on a member to be worked, the rectangular accuracy can be easily achieved by applying the member to be worked to the fence 5. Moreover, when groove cutting working is performed on a member to be worked, it is preferable to use the fences 5 and 6 having height and thickness (boldness) enough to hold strength by considering maximum cutting depth of the tool S.

By the above operation, various materials put between the fences 5 and 6 can be treated in a flexible manner and, for example, in the case of a square member, by rotating its working surface, cutting process with up to 2 times the cutting capability of the tool S is made possible.

Moreover, by securing the base plate 10 as the ruler tool 1 to the fences 5 and 6, stable working operation can be performed, however, in this case, it is preferable to make the fences 5 and 6 thinner by about 5 mm than a cutting capability of the tool S and to form the positioning groove 10*a* on the base plate 10.

When the ruler tool 1 is mounted on an operating base of a table or the like for use, it is desirous that the base member 10 is secured to the operating base by using a cramp.

Moreover, in combination with the base member 10, an underlying plate (not shown) with or without a groove corresponding to the groove 10*a* may be disposed between the fences 5 and 6 to adjust the height. Depending on kinds of working, in the case of cutting working, the underlying plate for the height adjustment may not be used (or the thickness of the plate may be varied) and, in the case of groove cutting, may be used for the height adjustment.

When a member is to be cut so as to have a fixed length, for example, by securing a separate extending fence to the fence 5 on a positioning side of a member to be worked, mounting an extending base member (not shown) having the same thickness as that of the base member 10 on the base member 10 in a manner to be adjacent to each other, making a cut using the tool S in a desired dimensional position of the extending fence, and securing a stopper or the like in a desired dimensional position from the cut position, the member to be worked being abutted against the stopper is cut one after another by a desired dimensional unit. Additionally, even if preparation is made so that a member to be worked is cut so as to have a fixed length, not only fixed-length cutting but also other type of cutting is made possible by positioning a member to be worked by using other fence 6.

By setting the sizes of the base member 10 and fence 5 to the size and length for fixed length or size cutting, and only by securing a stopper or the like to the base member 10 and fence 5, fixed length cutting is made possible. Moreover, mounting of the extending base member or extending fence, if the stopper can be fixed and positioning relative to the ruler tool can be performed, is not required.

Second Modified Example

Figure 12:
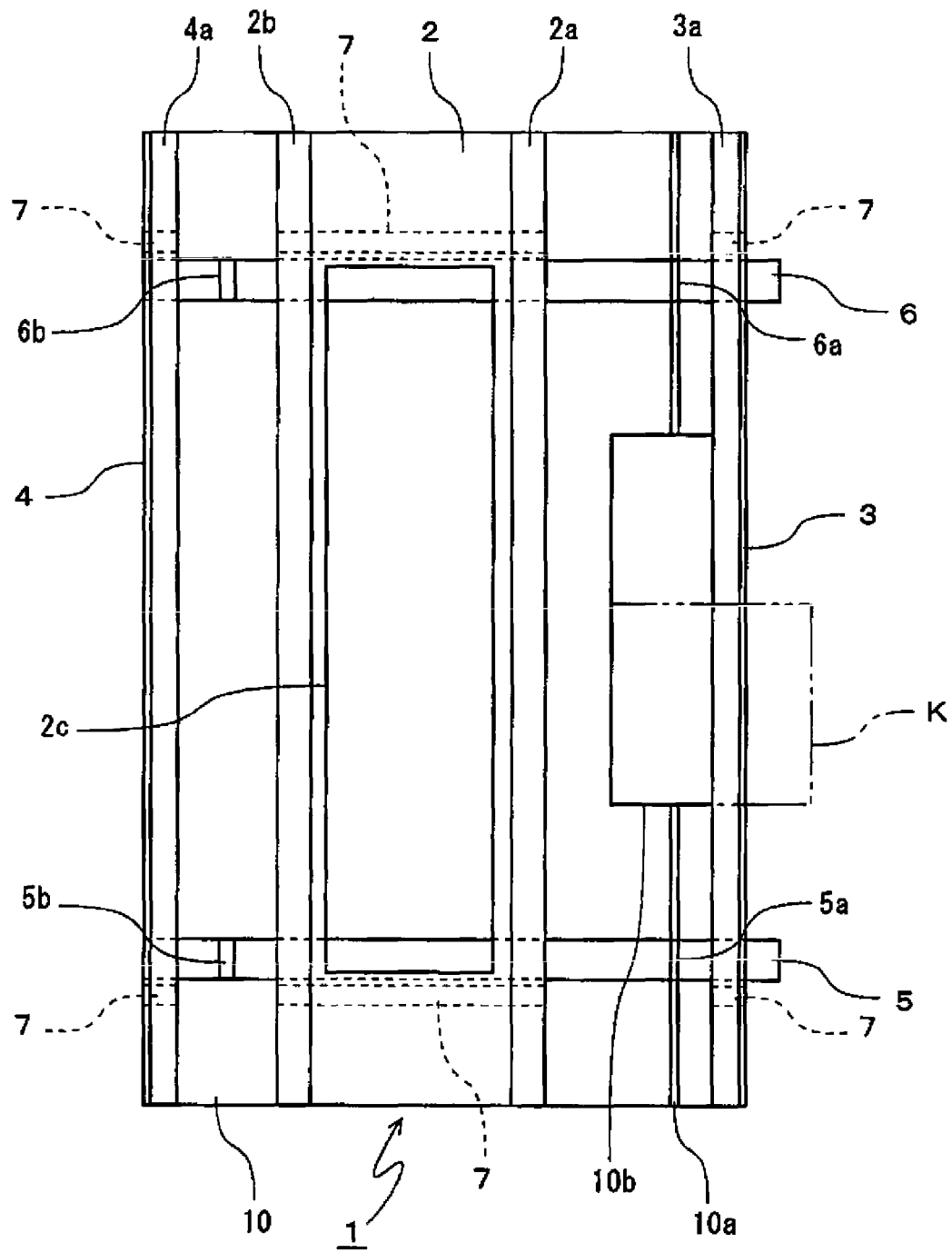
FIG. 12 is a plan view of a ruler tool of a second modified example of the embodiment of the present invention.

In the case of the ruler tool 1 having the above-mentioned base member 10, for example, as shown in FIG. 12, by forming an aperture 10b striding the positioning groove 10a, convex or concave tenon cutting work can be performed on a cut end of a square member K being a member to be worked.

By using an auxiliary tool (not shown) having a structure to which a square member K is vertically fixed and which is rectangularly held relative to the fences 5 and 6 and by moving, in parallel, the ruler tool 1 having the base member 10, over the auxiliary tool, a member to be worked can be worked. The aperture 10b can be ordinarily blocked by lid bodies (not shown) having the same shape.

Third Modified Example

Figure 13:
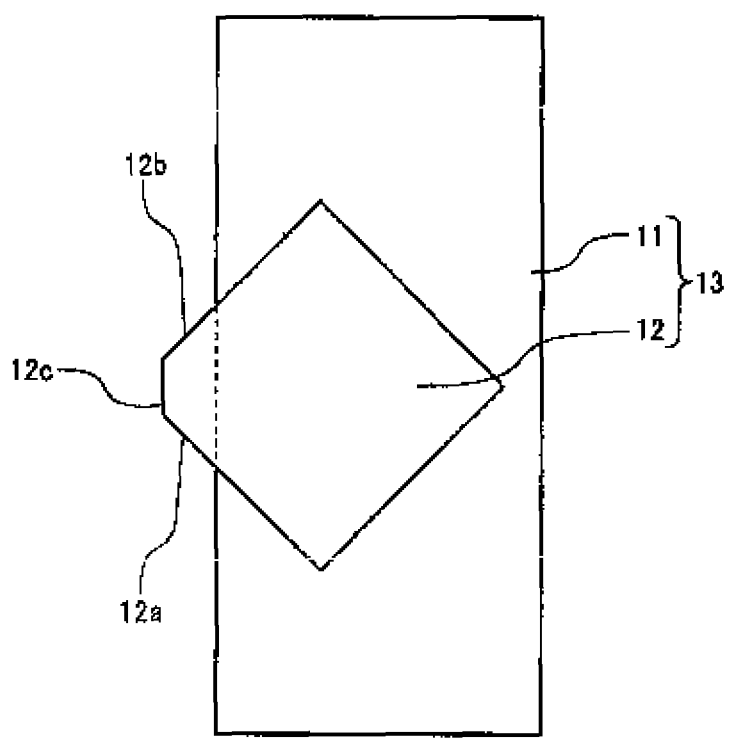
FIG. 13 shows an auxiliary ruler to be used for a ruler tool of a third modified example of the embodiment of the present invention.
Figure 13:
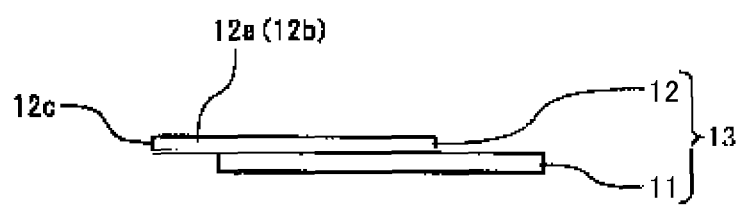

Working is possible, as shown in FIG. 13, by using an auxiliary ruler 13 to which an inclined fence 12 having a supporting surfaces 12a and 12b of a member to be worked inclined 45° relative to an inner wall of the fences 5 and 6 on an upper surface of an extending base member with the same thickness as that of the base member 10.

Moreover, the inclined fence 12 of several kinds with the supporting surfaces 12a and 12c having a desired angle relative to the inner wall of the fences 5 and 6 may be replaced and its angle can be changed by applying an attachment method arbitrarily.

Figure 14:
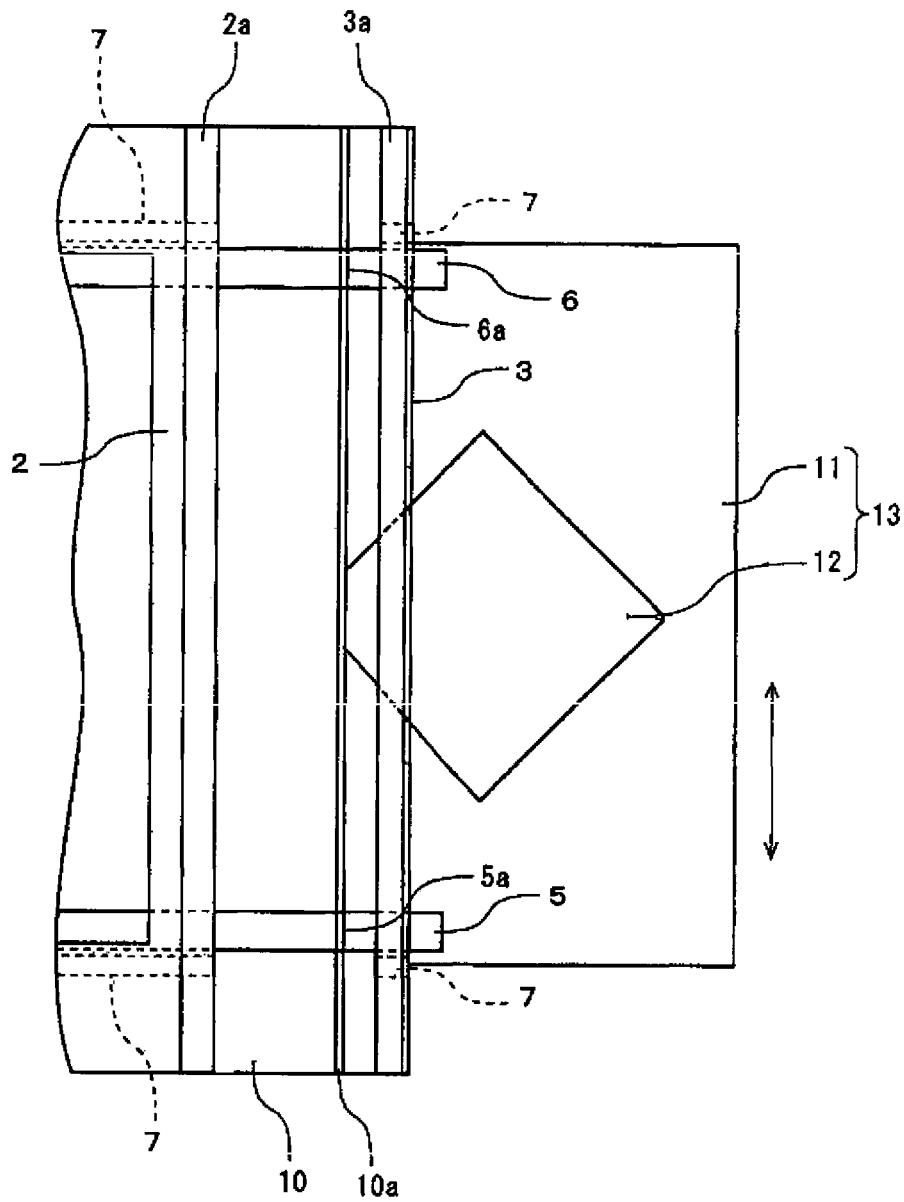
FIG. 14 is a plan view of main portions of the ruler tool of the third modified example of the embodiment of the present invention.
Figure 15:
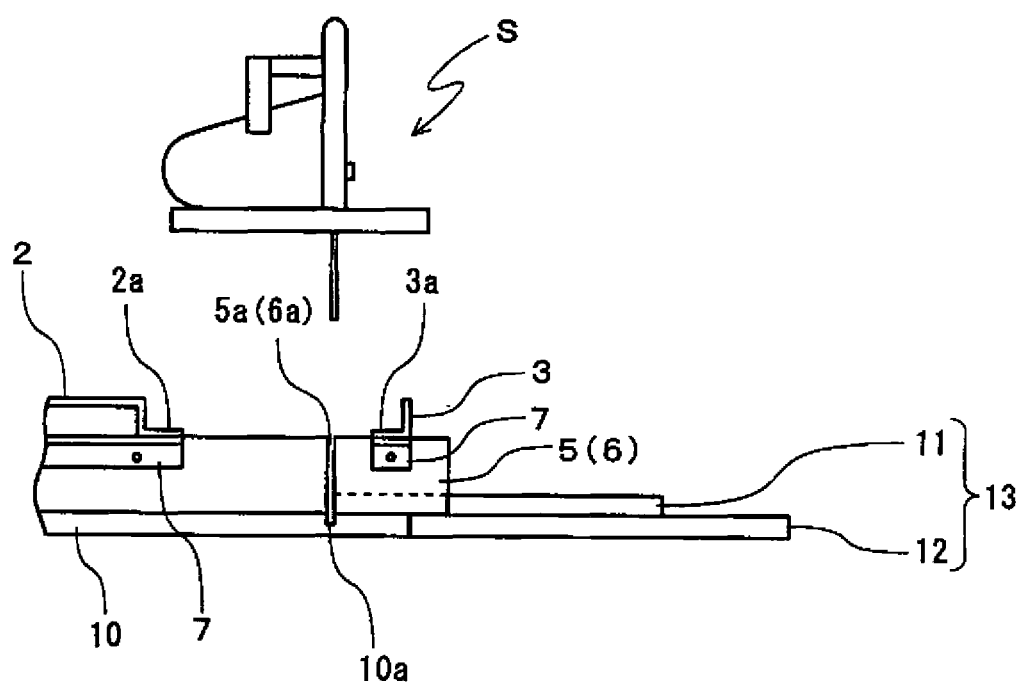
FIG. 15 is a front view of main portions of the ruler tool of the third modified example of the embodiment of the present invention.

As shown in FIGS. 14 and 15, one edge portion of the extending base member 11 is intimately formed on the side edge of the base member 10 and, in a state where one portion of the inclined fence 12 is extruded from one edge portion of the extending base member 11, by cutting an excessively extruded portion (not shown) with the tool S, a positioning end surface 12c corresponding to the groove 10a can be formed on the inclined fence 12.

In a state where a member to be worked such as a plate member is positioned at the supporting surface 12a of the member to be worked or at the supporting surface 12b of the member to be worked, by cutting an end portion of the member to be worked, diagonal cutting can be easily performed and, for example, by cutting an end portion of a member to be worked, diagonal cutting can be performed and, by cutting an end portion of two members to be worked positioned at the supporting surfaces 12a and 12b of the member to be worked, so-called closure cutting can be performed.

By making end portions of the fences 5 and 6 extrude from a side surface of the base member 10, when the auxiliary ruler 13 is moved along the side edges of the base material, an upper surface of the extending base member 11 can be pressed by the extruded portion of the fences 5 and 6 and lifting of the extending base member 11 can be suppressed.

Additionally, the guide fences 8 and 9, aperture 10b, and auxiliary ruler 13 or the like described in each of the modified examples can be used in combination with other known tools or rulers, thus enabling working of tenon cutting, closure cutting, or the like.

Third Example

Figure 16:
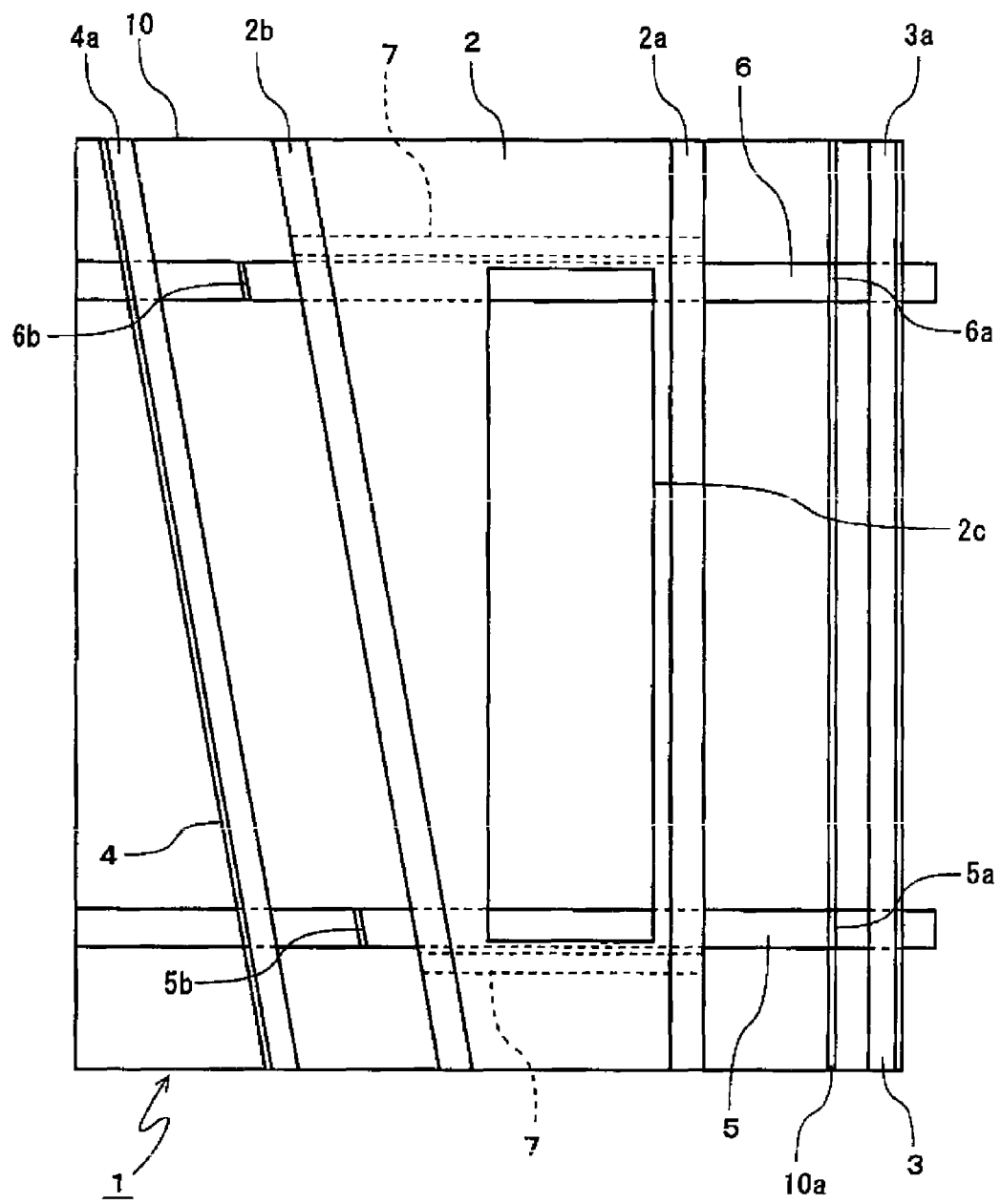
FIG. 16 is a plan view of the ruler tool of the third modified example of the embodiment of the present invention.
Figure 17:
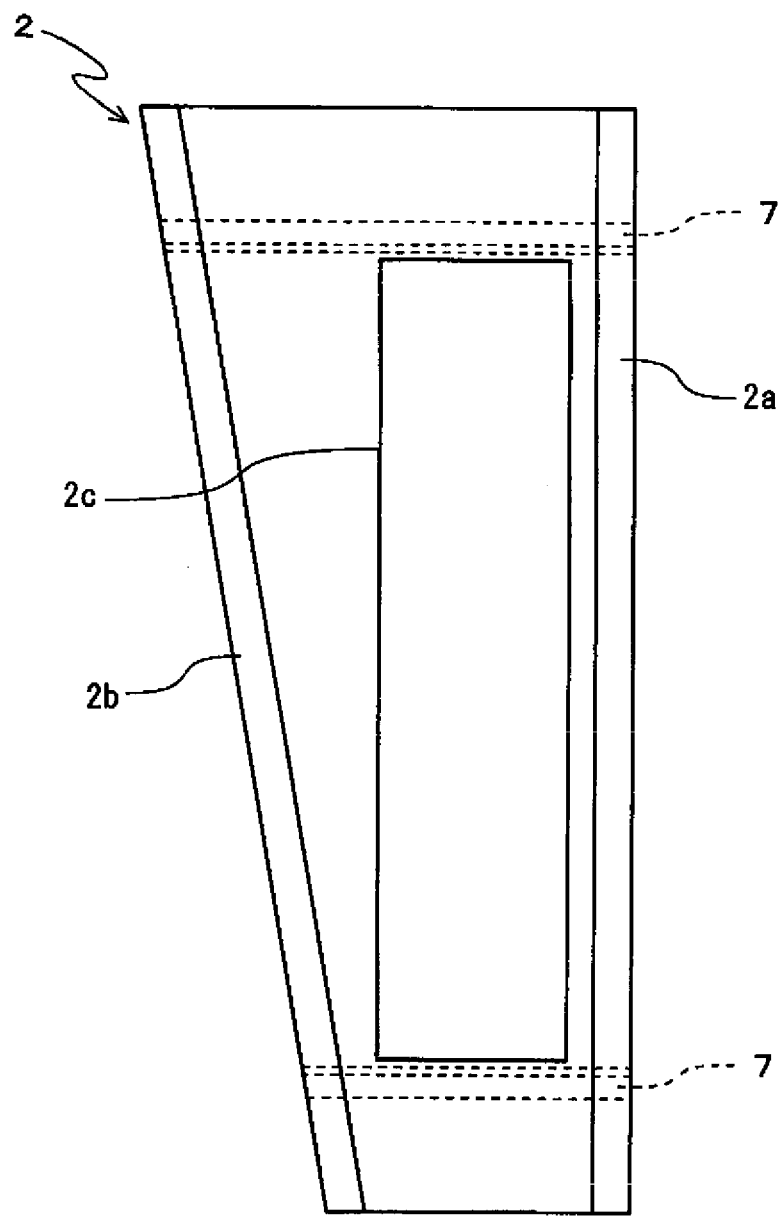
FIG. 17 is a plan view of a main guide frame to be used for the ruler tool of the third modified example of the embodiment of the present invention.

FIGS. 16 and 17 show a ruler tool of a third example of the embodiment of the present invention and FIG. 16 is a plan view showing the ruler tool of the third example of the embodiment and FIG. 17 is a plan view showing a main guide frame of the ruler tool of the third example of the embodiment.

As shown in FIGS. 16 and 17, the phase angles among the interval between the guide portion 2a of the main guide frame 2 and the guide portion 3a of the first guide frame 3 and the interval between the guide portion 2a of the main guide frame 2 and guide portion 4a of the second guide frame 4 are changed so that the tools S and T, same tools S, and same tools S can be positioned are guided at different angles.

Thus, the use of the same tool S, for example, enables different working such as rectangular or diagonal cutting to be performed by one ruler tool.

Moreover, each of the brackets 7 is connected to each of the guide frames 2, 3, and 4 by welding or the like and is secured to the fences 5 and 6 by screws, however, each of the guide frames 2, 3, and 4 may be secured to the fences 5 and 6 without the use of the brackets 7. In this case, it is necessary to consider the kinds of screws and/or securing places so that heads of screws do not extrude from the guide surfaces of guide portions 2a, 2b. 3a and 4a of the guide frame 2, 3, and 4, respectively. Mounting of the base plate 10 may be omitted.

Fourth Example

Figure 18:
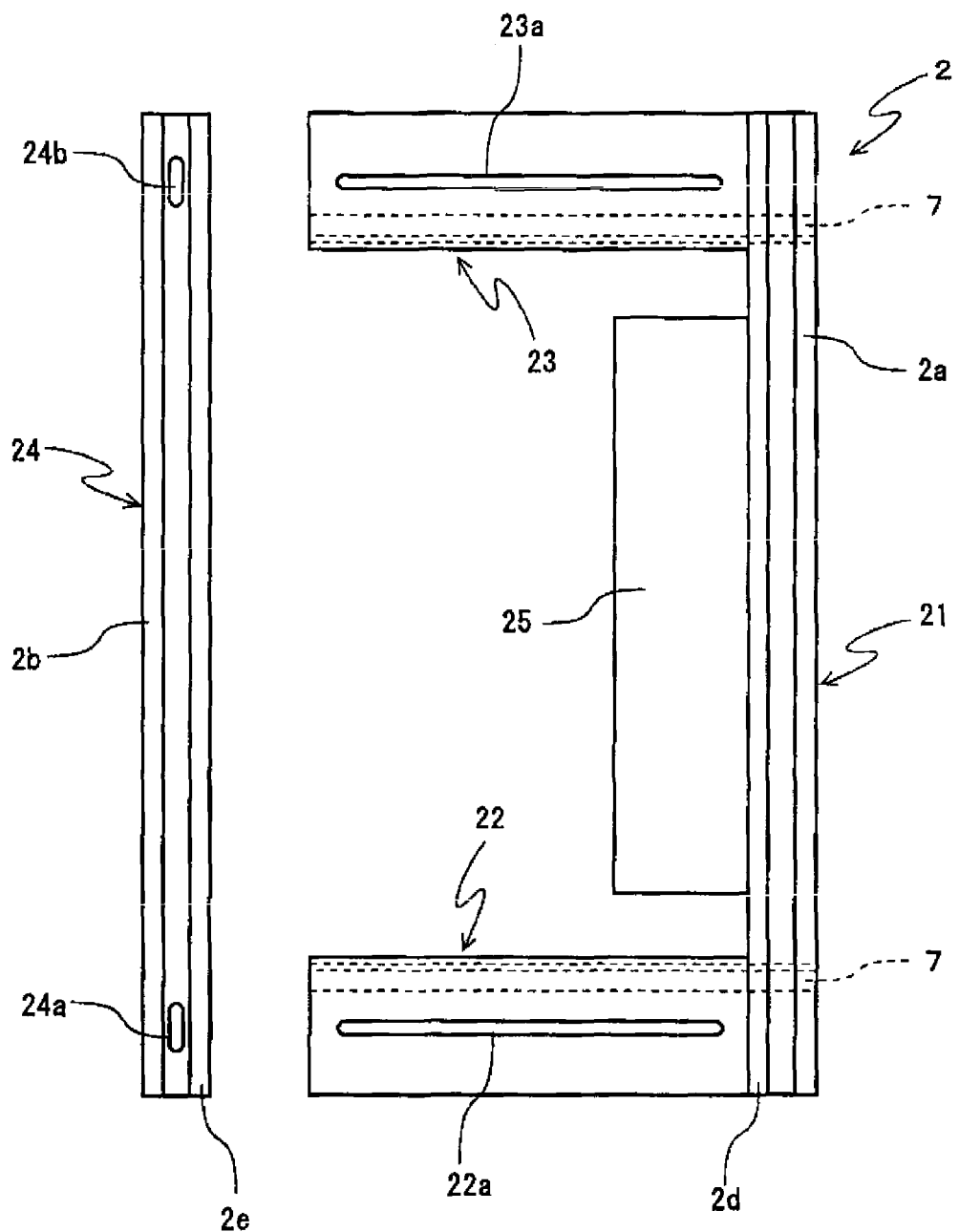
FIG. 18 is a plan view of the main guide frame to be used for a ruler tool of the fourth example of the embodiment of the present invention.

FIG. 18 shows a ruler tool of a fourth example of the embodiment of the present invention. FIG. 18 is also a plan view of a main guide frame to be applied to the ruler tool of the fourth example of the embodiment of the present invention.

As shown in FIG. 18, the main guide frame 2 to be applied to the ruler tool of the fourth example 4 is divided into two portions, one portion on the guide portion 2a and another portion on the guide portion 2b and, to the guide frame 21 having the guide portion 2a, frames 22 and 23 to be for fixing to the fences 5 and 6 are secured (by welding or by integral formation) and the guide frame 24 having the portion on the guide portion side are secured to the securing frames 22 and 23 through securing members (not shown) such as butterfly nuts.

By forming long holes 22a and 23a extending in a direction rectangular to the guide portion 2a, respectively, in the securing frames 22 and 23 as a fixing hole into which the securing members such as the butterfly nuts and also by forming long holes 24a and 24b extending in a direction parallel to the guide portion 2b in the guide frame 24, the interval between the guide frame 21 and guide frame 24 and angles relative to the guide portion 2a and guide portion 2b can be arbitrarily adjusted.

Moreover, it is preferable to mount a scale (not shown) for positioning of the guide frame 24 on the securing frames 22 and 23.

By forming another guide portion 2d and another guide portion 2e besides the guide portion 2a and 2b respectively in portions opposite to the guide frame 21 and guide frame 24, the guide frame 24 is used as having a shape to be referenced and the determination of fixing direction to the securing frames 22 and 23 is not required and, therefore, another third working guide can be formed irrespective of the guide frames 3 and 4.

Since there are the securing frames 22 and 23 disposed between the guide portion 2d and 2e of the third working guide, positioning grooves are not allowed to be formed in the fences 5 and 6. However, by attaching an acrylic plate 25 to the guide frame 24 and by securing the guide frame 24 to the securing frames 22 and 23 after being positioned to cut the acrylic plate 25 using the tool S or the like, the cut surface can be used as the positioning groove.

Thus, according to the ruler tool 1 of the present invention, positioning of a member to be worked by using positioning grooves 5a, 5b, 6a, and 6b (and 10a), skillexperience is not required and high accuracy working cannot be performed and it is made possible to assemble and disassemble on a site which enables easy portability. In the case of working of groove cutting or the like, the adjustment of its depth can be made by using another plate member different from the base member 10 and its depth can be adjusted on the site, enabling working or the like to be performed according to applications. Moreover, there is space between a member to be worked and tools S and T and the tools S and T do not slide directly on the member to be worked and, therefore, working accuracy is not affected by rolling surfaces of the member to be worked. Combined use of other attachment is easy, thus enabling improvement of its general versatility.

EXPLANATION OF REFERENCE SYMBOLS

1: Ruler tool
2: Main guide frame
   2a: Guide portion
   2b: Guide portion
3: Guide frame
   3a: Guide portion
4: Guide frame
   4a: Guide portion
5: Fence
   5a: Positioning groove
   5b: Positioning groove
6: Fence
   6a: Positioning groove
   6b: Positioning groove
10: Base member
   10a: Positioning groove
   10b: Aperture

What is claimed is:

1. A ruler tool comprising:
   a main guide frame having a guide portion in each portion facing each other;
   a first guide frame having a guide portion positioned in parallel to one guide portion of the main guide frame and operated to guide a tool in an extending direction in cooperation with the guide portion;
   a second guide frame having a guide portion positioned in parallel to another guide portion of the main guide frame and operated to guide a tool in an extending direction in cooperation with the guide portion; and
   a pair of fences each securing each of the guide frames with a predetermined interval being set among the guide frames so as to hold the tools, in a sandwiched manner, among the guide portion of the main guide frame, the guide portion of the first guide frame and, the second guide portion of the second guide frame,
   wherein each of the fences is mounted in a manner to face each other so as to be apart by a distance of more than a range of working by the tools for a member to be worked and at least one side portion of each of the guide frames is overhung outside a predetermined distance from one of the fences and is secured and an abutment surface and positioning groove are formed to support a member to be worked at a predetermined angle inside the one of the fences,
   wherein the pair of fences is secured to a plate-shaped base member, and
   wherein an extending base member having the same thickness as that of the base member and configured to be slid to the side surface of the base member and an inclined fence disposed on an upper surface of the base member and having a supporting surface member to be worked configured to be adjustable for angles relative to an inner wall of at least one of the pair of fences are mounted on the side of the base member.

2. The ruler tool according to claim 1, wherein a distance between the guide portion of the main guide frame and the guide portion of the first guide frame and a distance between the guide portion of the main guide frame and the guide portion of the second guide frame are disposed in a manner to have a different distance and to face each other.

3. The ruler tool according to claim 1, wherein phase angles among the interval between the guide portion of the main guide frame and the guide portion of the first guide frame and the interval between the guide portion of the main guide frame and guide portion of the second guide frame are changed and disposed in a manner to face each other so that the tools can be positioned are guided at different angles.

4. The ruler tool according to claim 1, wherein an underlying plate with a predetermined thickness is mounted between the pair of fences.

5. The ruler tool according to claim 1, wherein an extending fence is mounted in parallel to an inner wall of the one fence at least on the inner side of the pair of fences.

6. The ruler tool according to claim 1, wherein an end portion of at least one of the pair of fences extrudes from a side of the base member.

7. The ruler tool according to claim 1,
   wherein a guide fence being parallel to the pair of fences is mounted outside of at least one of the pair of fences.

* * * * *